(12) United States Patent
Koyama et al.

(10) Patent No.: US 7,860,021 B2
(45) Date of Patent: Dec. 28, 2010

(54) APPARATUS, SYSTEM AND METHOD FOR MAINTAINING COMMUNICATION BETWEEN AN INFORMATION PROCESSING DEVICE AND A SERVER

(75) Inventors: Masanobu Koyama, Osaka (JP); Kunio Gobara, Osaka (JP)

(73) Assignee: Panasonic Corporation, Osaka (JP)

( * ) Notice: Subject to any disclaimer, the term of this patent is extended or adjusted under 35 U.S.C. 154(b) by 460 days.

(21) Appl. No.: 11/575,885

(22) PCT Filed: Sep. 14, 2005

(86) PCT No.: PCT/JP2005/016937

§ 371 (c)(1),
(2), (4) Date: Mar. 23, 2007

(87) PCT Pub. No.: WO2006/035601

PCT Pub. Date: Apr. 6, 2006

(65) Prior Publication Data

US 2008/0069092 A1   Mar. 20, 2008

(30) Foreign Application Priority Data

Sep. 27, 2004   (JP)   .............................. 2004-279048

(51) Int. Cl.
*G01R 31/08* (2006.01)
*H04J 1/16* (2006.01)
*H04L 1/00* (2006.01)
*H04L 12/28* (2006.01)
*G06F 15/16* (2006.01)

(52) U.S. Cl. ........................ 370/252; 370/389; 709/227

(58) Field of Classification Search ................. 370/252, 370/389, 392

See application file for complete search history.

(56) References Cited

U.S. PATENT DOCUMENTS 6,810,259 B1 * 10/2004 Zhang ...................... 455/456.5

FOREIGN PATENT DOCUMENTS

JP   2003-502913 A   1/2003

(Continued)

OTHER PUBLICATIONS

Sanjoy Sen et al., Midcom-unaware NAT/Firewall Traversal, Internet Draft, draft-sen-midcom-fw-nat-00.txt [online], Sep. 2001. [retrieved on Dec. 6, 2006]. Retrieved from the Internet: <URL:http://www.watersprings.org/pub/id/draft-sen-midcon-fw-nat-00.txt>.
Japanese Office Action dated Sep. 29, 2009.

*Primary Examiner*—Ayaz R Sheikh
*Assistant Examiner*—Hoang-Chuong Q Vu
(74) *Attorney, Agent, or Firm*—Pearne & Gordon LLP

(57) ABSTRACT

An information processing device 1 includes a transmission judging section 11 for judging whether to transmit a repetition packet, a life judging section 12 for judging whether to set a life not reaching a server device 3 to the repetition packet, a life setting section 14 for setting the life of the repetition packet to the life not reaching the server device 3 when the life judging section 12 judges to set the life not reaching the server device 3, and setting the life of the repetition packet to the life reaching the server device 3 when the life judging section 12 judges to set the life reaching the server device, and a transmitting section 15 for transmitting a repetition packet having the life set by the life setting section 14, when the transmission judging section 11 judges to transmit the repetition packet. It is possible to reduce a processing burden on the server device in an information processing system provided with the information processing device for repetitively transmitting the packet and the server device for receiving the packet.

24 Claims, 6 Drawing Sheets

U.S. PATENT DOCUMENTS

| | | |
|---|---|---|
| 6,957,346 B1 | 10/2005 | Kivinen et al. |
| 7,072,341 B2 | 7/2006 | Xu et al. |
| 7,200,673 B1 * | 4/2007 | Augart ........................ 709/238 |
| 7,280,557 B1 * | 10/2007 | Biswas et al. ............... 370/465 |
| 7,418,511 B2 * | 8/2008 | Takechi et al. .............. 709/229 |
| 2003/0152034 A1 * | 8/2003 | Zhang et al. ................ 370/252 |
| 2003/0161265 A1 * | 8/2003 | Cao et al. ................... 370/229 |
| 2004/0151179 A1 * | 8/2004 | Andre et al. ................ 370/392 |
| 2004/0168062 A1 * | 8/2004 | Isozaki et al. ............... 713/171 |
| 2004/0174824 A1 * | 9/2004 | Ohta et al. .................. 370/252 |
| 2004/0215602 A1 * | 10/2004 | Cioccarelli ..................... 707/3 |
| 2004/0252693 A1 * | 12/2004 | Cheriton et al. .......... 370/395.1 |

FOREIGN PATENT DOCUMENTS

| | | |
|---|---|---|
| JP | 2004-120547 A | 4/2004 |
| JP | 2004-528774 A | 9/2004 |
| JP | 2005-323033 | 11/2005 |
| WO | 2004/030292 | 4/2004 |

\* cited by examiner

| | | | | |
|---|---|---|---|---|
| 1 | 2ms | 1ms | 1ms | 192.168.1.11 |
| 2 | 4ms | 4ms | 4ms | 155.32.10.1 |
| 3 | 6ms | 6ms | 6ms | 155.32.10.2 |
| 4 | 8ms | 9ms | 7ms | 155.32.10.3 |
| 5 | 8ms | 7ms | 7ms | 155.32.10.4 |
| ⋮ | ⋮ | ⋮ | ⋮ | ⋮ |
| 14 | 8ms | 8ms | 9ms | 155.32.10.8 |
| 15 | 8ms | 8ms | 8ms | 155.32.10.9 |
| 16 | 9ms | 9ms | 9ms | 155.32.10.10 |

REPLY TIME OF PACKET     ADDRESS OF RELAY NODE

| | | | | |
|---|---|---|---|---|
| 1 | * | * | * | Request timed out. |
| 2 | * | * | * | Request timed out. |
| 3 | * | * | * | Request timed out. |
| 4 | * | * | * | Request timed out. |
| 5 | * | * | * | Request timed out. |
| ⋮ | ⋮ | ⋮ | ⋮ | ⋮ |
| 14 | * | * | * | Request timed out. |
| 15 | * | * | * | Request timed out. |
| 16 | 9ms | 9ms | 9ms | 155.32.10.10 |

REPLY TIME OF PACKET OR NON RESPONSE     ADDRESS OF RELAY NODE OR NON RESPONSE

| TRANSMISSION SOURCE ADDRESS | TRANSMISSION DESTINATION ADDRESS | COUNTER |
|---|---|---|
| 192.168.1.11 | 152.32.10.10 | 1 |
| ⋮ | ⋮ | ⋮ |

| TRANSMISSION SOURCE ADDRESS | TRANSMISSION DESTINATION ADDRESS | COUNTER |
|---|---|---|
| 192.168.1.11 | 152.32.10.10 | 0 |
| ⋮ | ⋮ | ⋮ |

APPARATUS, SYSTEM AND METHOD FOR MAINTAINING COMMUNICATION BETWEEN AN INFORMATION PROCESSING DEVICE AND A SERVER

TECHNICAL FIELD

The present invention relates to an information processing device and the like for repetitively transmitting packets.

BACKGROUND ART

In an information processing device, a communication processing device, and an information processing system including a server device, for example, predetermined packets are repetitively transmitted to the server device through the communication processing device from the information processing device such as a home PC (Personal Computer) or electronic equipments (for example, WO 2004/030292). Here, the communication processing device is a router having, for example, NAT (Network Address Translation) function. One purpose in which the information processing device repetitively transmits the packets to the server device is to maintain a port of the communication processing device, and the other purpose is to perform a prescribed process in the server device.

First, the maintenance of the port of the communication will be described. In the communication processing device having the NAT function such as a router, when the packets are transmitted to the side of WAN (Wide Area Network) from the side of LAN (Local Area Network), a private IP address and a port number of the side of LAN are converted into a global IP address and a port number of the side of WAN. In addition, when the packets are received at the side of WAN, a filter process is performed by a predetermined receive filter rule, and the inverse conversion of an address conversion is executed, thereby sending the packets to the information processing device. At this time, a receive filter rule determines a receiving possibility of the packets from the side of WAN with respect to the port in which the packets are transmitted from the side of LAN of NAT. Moreover, and the receive filter rule includes an address sensitive filter that receives the packets from only an address transmitting the packets from the port, a Port Sensitive filter that receives the packets from only a port transmitting the packets from the port, and a No Filter having no filter. Time is set in the communication processing device, and the time performs such address conversion. More specifically, after a prescribed period has elapsed since a certain address conversion was lastly performed between the side of WAN and the side of LAN, the address conversion of the packets received from the side of WAN is not performed, but the address conversion of the packets received from the side of LAN is newly performed. That is, since the packets from the side of WAN are not received in the information processing device, it is inaccessible from an external device such as a cellular phone to the information processing device through the server device. The prescribed period will be called a port maintaining time. Accordingly, to maintain the port of the communication processing device so as to be accessible from the external device such as a cellular phone to the information processing device through the server device, that is, such that the packets from the side of WAN are transmitted to the information processing device through the server device, the packets are repetitively transmitted.

Next, a prescribed process of the packets to be repetitively transmitted, which performs in the server, will be described. For example, the prescribed process in the server is a process that is to know whether or not IP address at the side of WAN of the communication processing device is changed. The IP address at the side of WAN of the communication processing device may be modified every a prescribed period by a setting of a connection provider or the like. In such case, when the server device does not know the change of the address, the server device does not transmit information to the information processing device through the communication processing device. As a result, it is inaccessible from the external device such as a cellular phone to the information processing device through the server device. Accordingly, the packets are repetitively transmitted such that the server device knows the change of the address of the communication processing device.

However, when the server device accepts the packets to be repetitively and frequently transmitted, there is a problem that a processing burden on the server device increases that much. Especially, when the port maintaining time of the communication processing device having NAT function to which the information processing device is connected is short, the problem becomes remarkable. In addition, generally, since the packets are repetitively transmitted from plural information processing devices to one server device, the processing burden on the server device is increased that much.

DISCLOSURE OF THE INVENTION

The present invention has been made to solve the problem, and the invention relates to an information processing system including an information processing device for repetitively transmitting packets and a server device for receiving the packets. The object of the invention is to reduce a processing burden on a server device.

In order to achieve the object, an information processing device according to the invention transmits a packet into a server device through one or more communication processing device, and the information processing device includes a transmission judging section for judging whether to transmit a repetition packet that is the packet to be repetitively transmitted; a life judging section for judging whether to set a life not reaching a server device to the repetition packet; a life setting section for setting the life of the repetition packet to the life not reaching the server device when the life judging section judges to set the life not reaching the server device, and setting the life of the repetition packet to the life reaching the server device when the life judging section judges to set the life reaching the server device; and a transmitting section for transmitting a repetition packet having the life set by the life setting section, when the transmission judging section judges to transmit the repetition packet.

In addition, a communication processing system according to the invention is the information processing system including the information processing device, one or more communication processing device, and the server device.

A communication processing device according to the invention relays a repetition packet that is a packet to be repetitively transmitted to a server device from an information processing device, and the communication processing device includes a receiving section for receiving the repetition packet; a modification judging section for judging whether to modify a life of the repetition packet received in the receiving section; a life modifying section for modifying the life of the repetition packet received in the receiving section to a life not reaching the server device, when the modification judging section judges to modify the life of the repetition packet; and a transmitting section for transmitting the repetition packet.

In addition, an information processing system according to the invention is the information processing system including the communication processing device, the information processing device for transmitting the repetition packet, and the server device.

An information processing method according to the invention transmits a packet to a server device from an information processing device through one or more communication processing devices, and the information processing method includes a transmission judging step of judging whether to transmit a repetition packet that is a packet to be repetitively transmitted in the information processing device; a life judging step of judging whether to set a life not reaching a server device to the repetition packet in the information processing device; a life setting step of setting the life of the repetition packet to the life not reaching the server device, in case of judging to set the life not reaching the server device in the life judging step in the information processing device, and setting the life of the repetition packet to the life reaching the server device in case of judging to set the life reaching the server device in the life judging step; and a transmission step of transmitting a repetition packet having the life set in the life setting step to the server device, in case of judging to transmit the repetition packet in the transmission judging step in the information processing device.

A program to be executed by a computer carries out a processing that transmits a packet to a server device through one or more communication processing device according to the invention, the program causing a computer to execute a processing including a transmission judging step of judging whether to transmit a repetition packet that is the packet to be repetitively transmitted; a life judging step of judging whether to set a life not reaching the server device to the repetition packet; a life setting step of setting the life of the repetition packet to the life not reaching the server device in case of judging to set the life not reaching the server device in the life judging step, and setting the life of the repetition packet to the life reaching the server device in case of judging to set the life reaching the server device in the life judging step; and a transmission step of transmitting a repetition packet having the life set in the life setting step to the server device, in case of judging to transmit the repetition packet in the transmission judging step.

A program to be executed by a computer carries out a processing that relays a repetition packet, which is a packet to be repetitively transmitted, to a server device from an information processing device according to the invention, the program causing a computer to execute a processing including a receiving step of receiving the repetition packet; a modification judging step of judging whether to modify a life of the repetition packet received in the receiving step; a life modifying step of modifying the life of the repetition packet received in the receiving step to a life not reaching the server device in case of judging to modify the life of the repetition packet in the modification judging step; and a transmitting step of transmitting the repetition packet.

According to the information processing device or the like of the invention, since some repetition packets among the repetition packets to be repetitively transmitted from the information processing device do not reach the server device, it is possible to reduce the processing burden on the server device.

Figure 1:
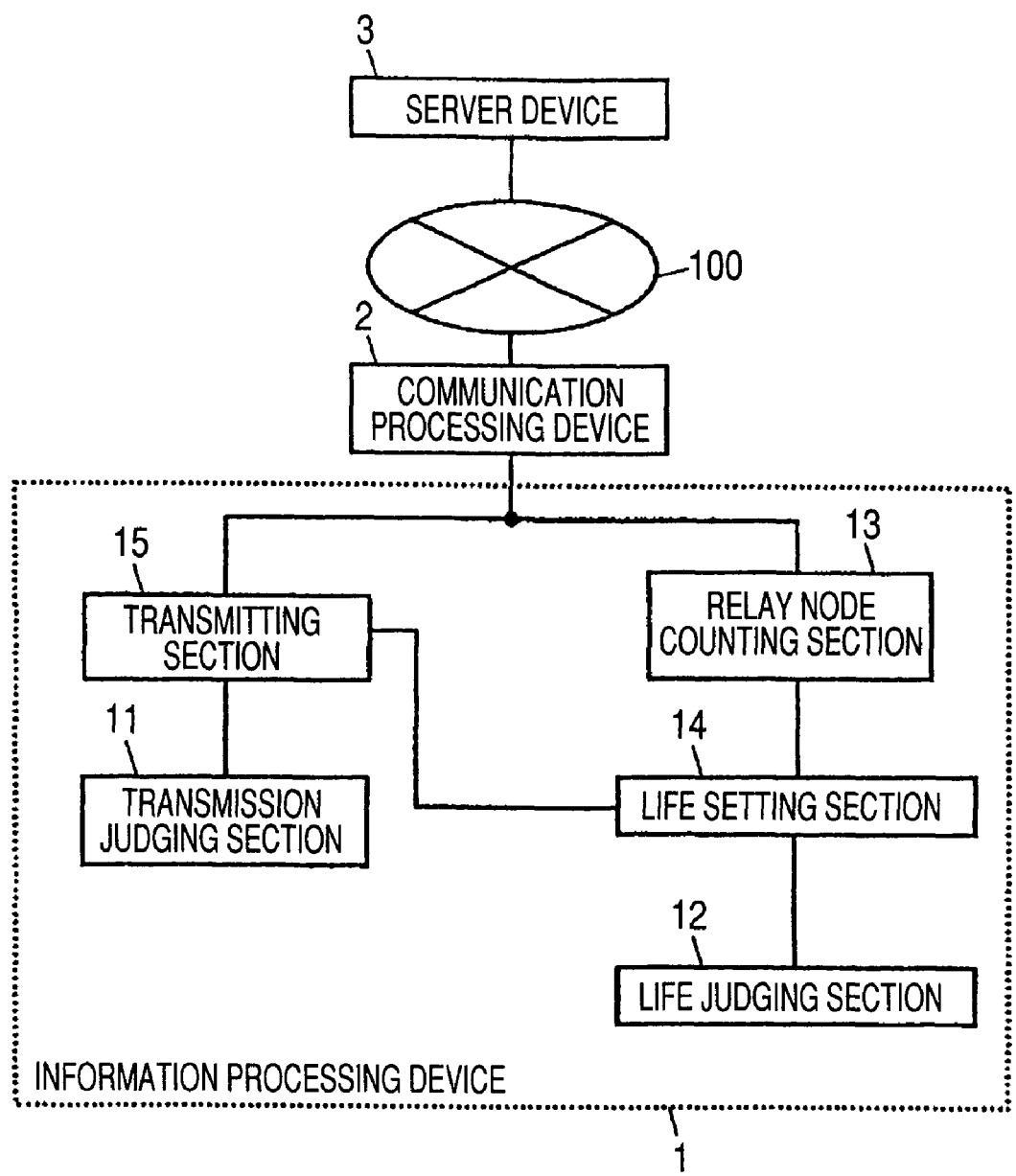
FIG. 1 is a block diagram showing a configuration of an information processing system according to a first embodiment of the invention.

REFERENCE NUMERALS 1, 4 information processing device
2, 5 communication processing device
3 server device
11 transmission judging section
12 life judging section
13 relay node counting section
14 life setting section
15, 54 transmitting section
51 receiving section
52 modification judging section
53 life modifying section

BEST MODE FOR CARRYING OUT THE INVENTION

An information processing device according to the invention transmits a packet into a server device through one or more communication processing device, and the information processing device includes a transmission judging section for judging whether to transmit a repetition packet that is the packet to be repetitively transmitted; a life judging section for judging whether to set a life not reaching a server device to the repetition packet; a life setting section for setting the life of the repetition packet to the life not reaching the server device when the life judging section judges to set the life not reaching the server device, and setting the life of the repetition packet to the life reaching the server device when the life judging section judges to set the life reaching the server device; and a transmitting section for transmitting a repetition packet having the life set by the life setting section, when the transmission judging section judges to transmit the repetition packet.

According to this configuration, when it is judged to set the life not reaching the server device, the repetition packet can be prevented from reaching the server device. Accordingly, the processing burden on the server device can be reduced compared with the case where all the repetition packets have reached the server device. Meanwhile, since it is considered that frequency in which the server device receives the repetition packet and a prescribed process (for example, a process that judges whether or not the IP address at the side of WAN of the communication processing device is changed) should be performed by using the packets is not so high, it is considered that there is no big influence even if some repetition packets do not reach the server device among the repetition packets transmitted from the information processing device to the server device. For example, it is because that frequency into which the IP address at the side of WAN of the communication processing device changes is very low compared with the port maintaining time. In addition, even when it is judged to set the life not reaching the server device, the life setting section may set the life that exceeds the communication processing device to the repetition packet so as to maintain the port in the communication processing device. Accordingly, it is possible to receive the packets, which are transmitted to the communication processing device from the server device, in the information processing device.

In the information processing device according to the invention, the life setting section may set the life of the repetition packet to a life that reaches one or more relay node just before the server device, when the life judging section judges to set the life not reaching the server device.

In this configuration, when it is judged to set the life not reaching the server device by the life judging section, the repetition packet can be prevented from reaching the server device.

In the information processing device according to the invention, the life setting section may set the life such that the repetition packet reaches a relay node for relaying the packet from a global address to a global address, when the life judging section judges to set the life not reaching the server device.

In this configuration, even when it is judged to set the life not reaching the server device by the life judging section, it is possible to maintain the port of the communication processing device.

In the information processing device according to the invention, the information processing device may further include a relay node counting section for counting the number of relay nodes from the information processing device, and the life setting section may set the life of the repetition packet on the basis of the number of the relay node counted by the relay node counting section.

In this configuration, the life of the repetition packet may be set on the basis of results counted by the relay node counting section, and the process which sets, for example, the number of the relay nodes until the server device and the number of stages of the communication processing device having the NAT function connected to the information processing device to the information processing device by manually inputting may be omitted. Accordingly, even though connection status of the communication processing device is modified (for example, even though the communication processing device to which the information processing device is connected is modified), it is possible to appropriately correspond to the change by counting again by the relay node counting section.

In the information processing device according to the invention, the life judging section may judge to set the life of a prescribed ratio of the repetition packets among the repetition packets to be transmitted, to a life not reaching the server device.

According to this configuration, since a prescribed ratio of the repetition packet does not reach the server device, the processing burden on the server device can be reduced compared with the case where all the repetition packets have reached the server device.

In the information processing device according to the invention, the life judging section may judge to set the life of the repetition packets satisfying a prescribed condition among the repetition packets to be transmitted, to a life not reaching the server device.

In this configuration, since the repetition packet satisfying a prescribed condition not reach the server device, the processing burden on the server device can be reduced compared with the case where all the repetition packets have reached the server device.

A communication processing device according to the invention relays a repetition packet that is a packet to be repetitively transmitted to a server device from an information processing device, and the communication processing device includes a receiving section for receiving the repetition packet; a modification judging section for judging whether to modify a life of the repetition packet received in the receiving section; a life modifying section for modifying the life of the repetition packet received in the receiving section to a life not reaching the server device, when the modification judging section judges to modify the life of the repetition packet; and a transmitting section for transmitting the repetition packet.

In this configuration, when it is judged to modify to the life not reaching the server device, the repetition packet can be prevented from reaching the server device. Therefore, the processing burden on the server device can be reduced compared with the case where all the repetition packets have reached the server device.

In the communication processing device according to the invention, the modification judging section may judge to modify the life of a prescribed ratio of the repetition packet among the repetition packets received in the receiving section.

According to this configuration, since a prescribed ratio of the repetition packet does not reach the server device, the processing burden on the server device can be reduced compared with the case where all the repetition packets have reached the server device.

In the communication processing device according to the invention, the modification judging section may judge to modify the life of the repetition packet satisfying a prescribed condition among the repetition packets received in the receiving section.

In this configuration, since the repetition packet satisfying a prescribed condition not reach the server device, the processing burden on the server device can be reduced compared with the case where all the repetition packets have reached the server device.

First Embodiment

An information processing system according to a first embodiment of the invention will be described with reference to the accompanying drawings.

FIG. 1 shows a configuration of an information processing system according to a first embodiment. In FIG. 1, the information processing system according to the first embodiment of the invention includes an information processing device 1, a communication processing device 2, and a server device 3. One information processing device 1 is connected to the communication processing device 2 in FIG. 1, but more than two information processing devices may be connected to the communication processing device 2. The information processing device 1 may be, for example, a personal computer, a microwave oven, a telephone, a printer, a facsimile machine, a refrigerator, a laundry machine, an air conditioner, a television, a video recorder, or a set top box. The communication processing device 2 is connected to the server device 3 through a communication line 100 of a cable or wireless. The communication line 100 is, for example, an internet or intranet. Furthermore, one communication processing device 2 is connected to the communication line 100 in FIG. 1, but more than two communication processing devices may be connected to the communication line 100.

The information processing device 1 includes a transmission judging section 11, a life judging section 12, a relay node counting section 13, a life setting section 14, and a transmitting section 15.

The transmission judging section 11 judges whether or not it is necessary to transmit a repetition packet. Here, the repetition packet means the packet that is repetitively transmitted by the information processing device 1. To transmit repetitively indicates to transmit many times repetitively. The transmission period may be a constant (for example, every five minutes), or may be an irregular (for example, changed between four minutes and five minutes). When the transmission period is a constant, for example, the transmission judging section 11 judges that the repetition packet is transmitted every a prescribed time (for example, five minutes) to be set. In addition, it is necessary to usually set such that the period for transmitting the repetition packet is shorter than a port holding time of the communication processing device 2. Some data may be included in a pay load, and no data may be included in the pay load. The repetition packet is, for example, the packet of UDP (User Datagram Protocol) or TCP (Transmission Control Protocol).

The life judging section 12 judges whether to set the life not reaching the server device 3 to the repetition packet. Here, the life is to show the limitation where the packet can exist (can be communicated) in the communication line 100. This life may be to show the limitation (for example, one minute) of the period in which the packet can exist in the communication line 100, and the life may be to show the limitation (for example, 255 relay nodes) of the number of a relay node in which the packet can pass through the communication line 100. As a latter example, there is TTL (Time To Live) that the packet possesses. If the life is used up, the packet will not be communicated any more. In addition, when the life is used up, it may be configured such that the gist thereof is notified to the transmission source of the packet.

For example, the life judging section 12 may judge to set the life of a prescribed ratio of the repetition packets among the repetition packets to be transmitted, to a life not reaching the server device 3, or the life judging section 12 may judge to set the life of the repetition packets satisfying a prescribed condition among the repetition packets to be transmitted, to a life not reaching the server device 3. In the first embodiment of the invention, the former will be described.

The relay node will be described herein. The relay node has a routing function for routing the packets and is called as a so-called "router". The relay node may have an NAT function or not have. That is, the relay node may relay the packets from a global address to a global address without executing an address conversion, and may relay the packets between a global address and a private address by executing the address conversion. The phrase "relay the packet from a global address to a global address" means that address information (information including a transmission source address and a transmission destination address) included in both headers of the packets received by the relay node and the packets transmitted from the relay node is address information of the global address. Meanwhile, the phrase "relay the packets between a private address and a global address" means that the private address is included in the address information included in the headers of some packets out of the packets that are received and transmitted for the relay, and means that the address information included in the headers of the others packets is the address information of the global address. In addition, when the packets are relayed, it may change the information included in the pay load of the packets and may not necessary to change the information. Furthermore, the communication processing device 2 is also included in the relay node.

The relay node counting section 13 counts the number of the relay node from the information processing device 1. For example, the relay node counting section 13 may count the number of the relay node until the server device 3, may count the number of the relay node until another server device other than the server device 3, and may count the number of the relay node until the relay node relaying the packets from the global address to the global address. Methods of counting the number of the relay nodes are follows. That, for example, when the setting of the life is performed by the setting of TTL included in the headers of the packets, the number of the relay nodes may be counted by, for example, a trace route, or may be counted by transmitting the UDP packet in which TTL is set while TTL is increased one by one. In the first embodiment of the invention, the number of the relay nodes is counted by the trace route. The process of the counting will be described more fully hereinafter. In addition, the relay node counting section 13 may include a transmission device (for example, a modem or network card) for transmitting the packets during the counting of the relay nodes, or may not. Moreover, the relay node counting section 13 may be realized by hardware, or may be realized by software such as a driver for driving the transmission device.

The life setting section 14 sets the life of the repetition packets to a life not reaching the server device 3, when the life judging section 12 judges that the life not reaching the server device 3 is set. In addition, the life setting section 14 sets the life of the repetition packets to a life reaching the server device 3, when the life judging section 12 judges that the life reaching the server device 3 is set. Here, the phrase "the life judging section 12 judges to set the life not reaching the server device 3" may be the same means as the case in which the life judging section 12 does not judge to set the life reaching the server device 3. Moreover, the phrase "the life judging section 12 judges to set the life reaching the server device 3" may be the same means as the case in which the life judging section 12 does not judge to set the life not reaching the server device 3. Therefore, the life judging section 12 may judge either of "set the life not reaching the server device 3" or "set the life reaching the server device 3"

In addition, when the life judging section 12 judges to set the life not reaching the server device 3, the life setting section 14 may, for example, (1) set the life so that the repetition packets reach the relay node one or more just before the server device 3, (2) set the life so that the repetition packets reach the relay node relaying the packets from the global address to the global address, and set the life by a combination of (1) and (2). Meanwhile, when the life judging section 12 judges to set the life reaching the server device 3, the life setting section 14 may, for example, set the life so that the repetition packets reach the server device 3 by using the number of the relay node from the information processing device 1 to the server device 3, or may set the longest life capable of setting to the repetition packets or a long life that the repetition packets can reach the server device 3.

In addition, the life setting section 14 sets the life of the repetition packet on the basis of the number of the relay nodes counted by the relay node counting section 13. That is, the life setting section 14 sets the life of the repetition packet by using the number of the counted relay nodes. For example, if 15 relay nodes (the server device 3 is not included in 15 relay nodes) are counted until the server device 3, when the life judging section 12 judges to set the life not reaching the server device 3, it may set the life by setting TTL to 15. As an another example, as a result of the count by the relay node counting section 13, if 2 relay nodes are counted until the relay node which is the closest to the information processing device 1 out of the relay nodes relaying the packets from the global address to the global address, when the life judging section 12 judges to set the life not reaching the server device 3, it may set the life by setting TTL to 2.

The transmitting section 15 transmits the repetition packet having the life set by the life setting section 14, when the transmission judging section 11 judges to transmit the repetition packet. In addition, the transmitting section 15 may include a transmission device (for example, modem or network card) for performing the transmission or may not. When the transmitting section 15 includes the transmission device, the transmission device (not shown) is disposed between the transmitting section 15 and the communication line 100. Furthermore, the transmitting section 15 may be realized by hardware, or may be realized by software such as a driver for driving the transmission device.

In addition, the relay node counting section 13 and the transmitting section 15 may use a common transmission device or may use different transmission devices, respectively.

Furthermore, the information processing device 1 has a mechanism for receiving information transmitted from the server device 3, but the mechanism is not shown in FIG. 1. That is, FIG. 1 is a view showing only distinguished configuration of the information processing device 1 according to the first embodiment of the invention.

The communication processing device 2 is one of the relay nodes and has an NAT function. That is, the communication processing device 2 performs the address conversion, thus relaying the packet between the private address and the global address.

The server device 3 receives the repetition packet transmitted from the information processing device 1 and performs a prescribed process by using this repetition packet. The prescribed process includes, for example, a process that judges whether or not the global address at the side (the side of the communication line 100) of WAN of the communication processing device 2 are modified and a process that modifies an address of the communication process device 2 registered in the server device 3 when the global address at the side of WAN of the communication processing device 2 is modified.

Next, the operation of the information processing device according to the first embodiment of the invention will be described with reference to the flowchart of FIG. 2.

(Step S101) The relay node counting section 13 counts the number of the relay nodes. Moreover, the relay counting section 13 notifies the number of the counted relay nodes to the life setting section 14.

(Step S102) The transmission judging section 11 judges whether to transmit the repetition packet. In addition, when the repetition packet is transmitted, the process goes step S103. Meanwhile, when the repetition packet is not transmitted, the process returns to step S102.

(Step S103) The life judging section 12 judges whether to set the life reaching the server device 3 to the repetition packet to be transmitted. In addition, when the life not reaching the server device 3 is set, the process notifies the gist to the life judging section 14 and goes to step S104. Meanwhile, when the life reaching the server device 3 is set, the process notifies the gist to the life judging section 14 and goes to step S105.

(Step S104) The life setting section 14 sets the life not reaching the server device 3 to the repetition packet. This setting of the life is executed, for example, by writing information indicating the life in a prescribed memory.

(Step S105) The life setting section 14 sets the life reaching the server device 3 to the repetition packet. This setting of the life is executed, for example, by writing information indicating the life in a prescribed memory.

(Step S106) The transmitting section 15 transmits the repetition packet having the life that is set by the life setting section 14 in step S104 or step S105 to the server device 3. That is, the transmission destination address included in the header of the repetition packet transmitted by the transmitting section 15 is an address of the server device 3. Then, the process returns to step S102.

Figure 2:
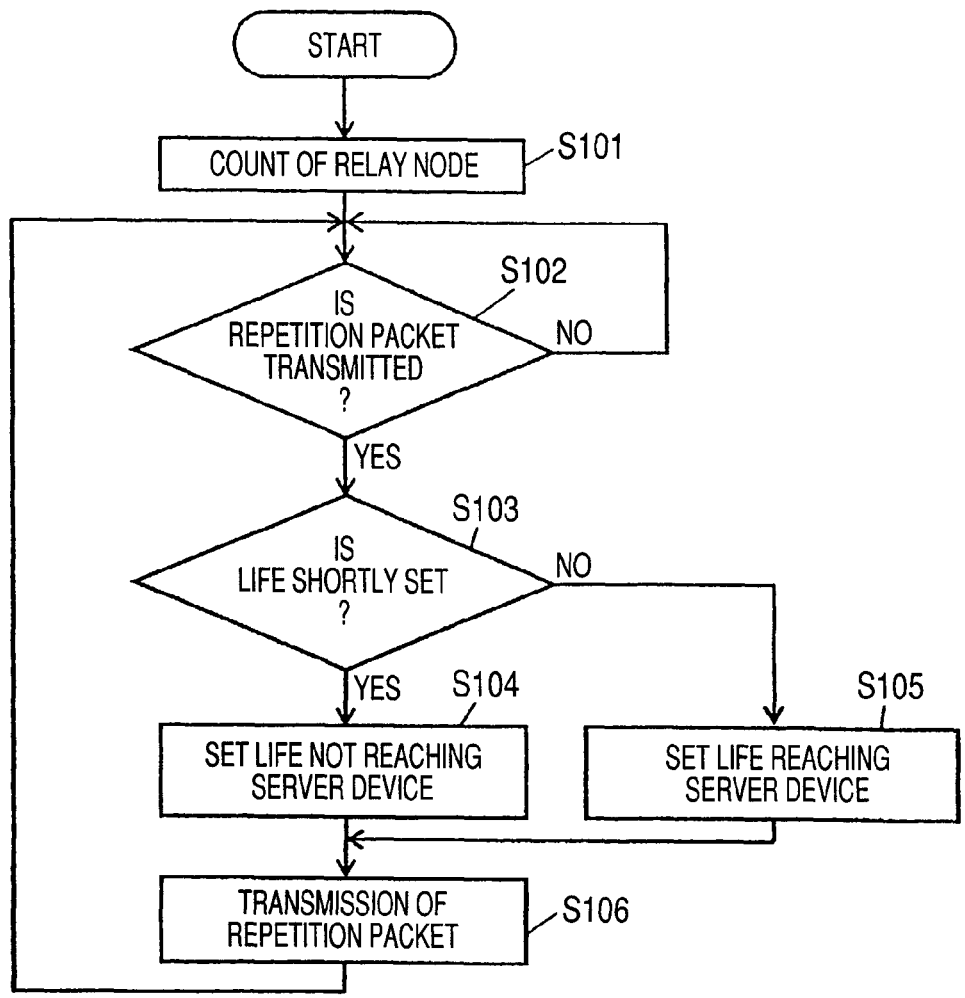
FIG. 2 is a flow chart showing an operation of an information processing device according to a first embodiment of the invention.

Furthermore, in the flowchart of FIG. 2, the process is accomplished by a power-off or an interruption of a processing end.

Next, a method in which the relay node counting section 13 counts the number of the relay nodes by the trace route will be described. The trace route traces a path from a device (here, information processing device 1) for executing the trace route to a receive destination (here, server device 3) of the trace route. For this reason, it is possible to know IP address of each relay node until the receive destination of the trace route.

Figure 3:
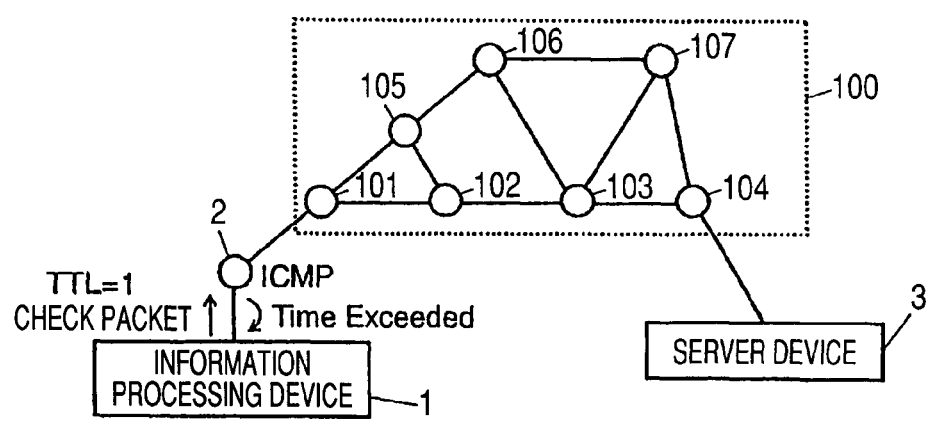
FIG. 3 is a view explaining a trace route according to a first embodiment of the invention.
Figures 4, 5, 6:
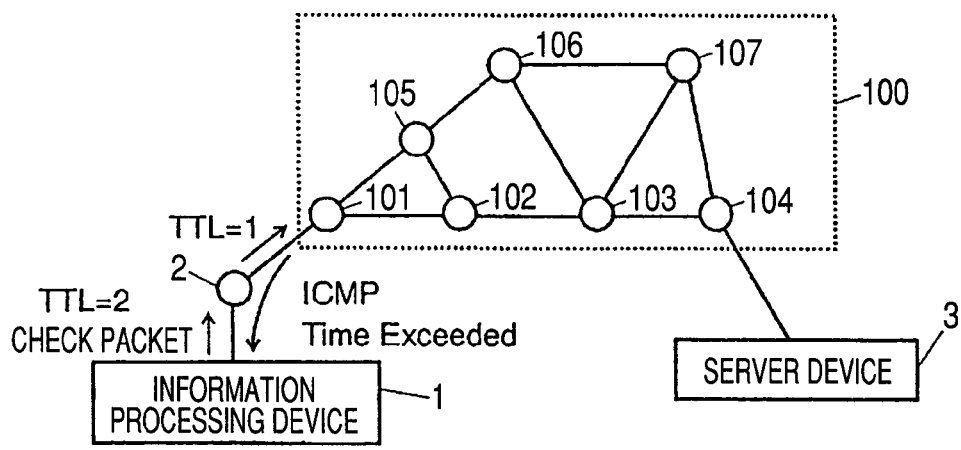
FIG. 4 is a view explaining a trace route according to a first embodiment of the invention.
FIG. 5 is a view explaining a trace route according to a first embodiment of the invention.
FIG. 6 is a view explaining a trace route according to a first embodiment of the invention.

FIG. 3 and FIG. 4 are views explaining the trace route. In FIGS. 3 and 4, the relay nodes are represented by a rounded shape.

As shown in FIG. 3, firstly, the relay node counting section 13 of the information processing device 1 transmits a check packet of TTL=1 toward the server device 3. Here, the check packet is a packet transmitted toward the transmission destination in the trace route. TTL is set in the check packet. Since TTL of the check packet is reduced by one whenever passing through the relay nodes, TTL of the check packet becomes zero (TTL=0) when the check packet of TTL=1 reaches the communication process device 2. Therefore, the check packet returns to the information processing device 1 from the communication processing device 2 by an internet control message protocol time exceeded (ICMP Time Exceeded, hereinafter, referred to as ICMP Time Exceeded) Next, as shown in FIG. 4, the relay node counting section 13 transmits a check packet of TTL=2 toward the server device 3. Then, TTL of the check packet becomes zero (TTL=0) in the relay node 101, and the check packet returns to the information processing device 1 from the relay node 101 by ICMP Time Exceeded. In this way, the relay node counting section 13 can know IP address of the relay node 101.

As described above, the transmission of the check packet and the reception of the ICMP Time Exceeded are repeated by increasing TTL by one until the check packet reaches the server device 3. For this reason, it is possible to know IP address of each relay node passing through until the check packet reaches the server device 3. In addition, when the relay node does not return the ICMP Time Exceeded, a reply about the transmitted check packet is nothing. In this case, after it becomes a time out, the relay node counting section 13 transmits a following check packet. When the check packet reaches the server device 3, ICMP Port Unreachable is returned. Therefore, the trace route is finished. Furthermore, depending on circumstances, instead of ICMP Port Unreachable, ICMP Echo Reply may be returned. The relay node counting section 13 can know the number of the relay nodes and IP address of each relay node passing through until the server device 3 by performing the trace route.

In addition, the case in which the trace route is performed with respect to the server device 3 is described herein, but the relay node counting section 13 may count the number of the relay nodes by the method other than the trace route, and the transmission destination of the check packet may be a server device other than the server device 3.

Next, the operation of the information processing system according to the first embodiment of the invention will be described by using an illustrative example. As an illustrative example, the relay node counting section 13 counts the number of the relay nodes by the trace route. In addition, the life setting section 14 sets the life by setting TTL of the repetition packet. Furthermore, a port maintaining time of the communication processing device 2 is two minutes and thirty seconds, and the transmission judging section 11 judges to transmit the repetition packet every two minutes. In addition, the life judging section 12 allows the one repetition packet out of ten repetition packets to reach the server device 3. Furthermore, since the life judging section 12 has a counter, the life judging section 12 increases the value of this counter by one whenever the repetition packet is transmitted. If a first-order digit (lowest-order digit) of the value of the counter is "0", the life judging section 12 judges to set the life reaching the server device 3. Meanwhile, if the first-order digit of the value of the counter is number other than "0", the life judging section 12 judges to set the life not reaching the server device 3. It is assumed that the initial value of the counter is "0". In addition, each IP address of the information processing device 1, the communication processing device 2, and the server device 3 is as follows. Here, IP address of the communication processing device 2 is IP address at the side of WAN of the communication processing device 2.

Information processing device 1: 192. 168. 1. 11
Communication processing device 2: 202. 132. 10. 6
Server device 3: 155. 32. 10. 10

First, the power supply is turned on, and the information processing device 1 is started up. And then, the relay node counting section 13 executes the trace route with respect to a predetermined IP address "155. 32. 10. 10" of the server device 3. Results obtained by the execution of the trace route are shown in FIG. 5. In FIG. 5, each row corresponds to one relay node (strictly speaking, last row corresponds to not the relay node but the server device 3. The rightmost information of each row is IP address of the relay node. Three packets are transmitted to one TTL in this trace route. The time until the reply of three packets is included in each row. The leftmost information of each row is the number of the relay nodes from the information processing device 1. Accordingly, from the results of the trace route shown in FIG. 5, it may know that the number of the relay nodes until the server device 3 is 15, and the number of the relay nodes until the nearest relay node (here, referred to as a relay node having the global address) relaying the packets from the global address to the global address is 2. Here, the term "the nearest" means that it is the nearest to the information processing device 1.

If the count of the relay nodes by the relay node counting section 13 is finished, the transmission judging section 11 judges as a timing that transmits the repetition packet (Step S102). In this case, it is the transmission of a first repetition packet, and since the value of the counter of the life judging section 12 is "0", the life judging section 12 judges to set the life reaching the server device 3 to the repetition packet (Step S103), and the life setting section 14 sets TTL to the maximum value of 255 (Step S105). The transmitting section 15 transmits the repetition packet having TTL=255 set by the life setting section 14 to IP address "155. 32. 10. 10" of the server device 3 (Step S106). In addition, the pay load of the repetition packet includes device identification information that is information for identifying the information processing device 1. This device identification information is, for example, MAC address of the information processing device 1. The server device 3 may identifies the information processing device 1 by this device identification information.

The transmission source IP address of the repetition packet transmitted from the information processing device 1 is converted into "202. 132. 10. 6" in the communication processing device 2. In addition, the conversion (allocation of the port) of the transmission source port is performed together with the address conversion in the communication processing device 2. Moreover, the repetition packet after, for example, the address conversion is transmitted to the server device 3 from the communication processing device 2 and is received to the server device 3. The process of the repetition packet in the server device 3 will be omitted.

The transmission judging section 11 allows a timer to start at the timing in which the transmitting section 15 transmits the repetition packet. In addition, the transmitting section 15 transmits the repetition packet, the life judging section 12 increases the counter by one. Here, since it is the transmission of the first repetition packet, the value of the counter becomes "1".

If the value of the timer becomes two minutes, the transmission judging section 11 judges to be a timing that transmits the repetition packet (Step S102). In this case, since the value of the counter is "1", the life judging section 12 judges to set the life not reaching the server device 3 to the repetition packet (Step S103). As a result, the life setting section 14 sets TTL to 2 by using the result of the trace route by the relay node counting section 13 such that the repetition packet reaches the relay nodes having the global address "155. 32. 10. 1" (Step S104). The transmitting section 15 transmits the repetition packet having TTL=2 set by the life setting section 14 to the server device 3 (Step S106). Due to this transmission, the timer is reset in the life judging section 11, the timing is restarted. In addition, in the life judging section 12, the value of the counter becomes 2 by increasing by one.

In this way, when the value of the counter is from "2" to "9", the repetition packet having TTL=2 is transmitted every two minutes as well as the case in which the value of the counter is "1". When a tenth repetition packet is transmitted after the information processing device 1 is started up, the timer is reset and the counter becomes "0" by increasing by one. Here, it is assumed that the value of the counter has only the value of a first digit of a decimal number. Therefore, if the value "9" of the counter is increased, the value becomes "0".

Then, if the value of the timer becomes two minutes, the transmission judging section 11 judges to be a timing that transmits the repetition packet (Step S102). In this case, since the value of the counter is "0", the life judging section 12 judges to set the life reaching the server device 3 to the repetition packet (Step S103). As a result, the life setting section 14 sets TTL to 255 (Step S105). Moreover, the transmitting section 15 transmits the repetition packet having TTL=255 to the server device 3 (Step S106). In this way, the transmission of the repetition is repeated every two minutes, and the port is maintained in the communication processing device 2.

In addition, according to this illustrative example, the case where the life setting section 14 sets the lowermost life that the repetition packet can reach to the relay node relaying the packets from the global address to the global address is described when the life judging section 12 judges to "set the life not reaching the server device 3" by using the results of the trace route shown in FIG. 5. However, depending on the results of the trace route, it may be not able to know IP address of the relay node from the viewpoint of security, as shown in FIG. 6. Furthermore, when the packets does not respond from the relay nodes, "*" is described in the column of the reply time of FIG. 6, and "Request timed out." is described in the column of the address of FIG. 6. In this case, when the life judging section 12 judges to "set the life not reaching the server device 3" by using the results of the trace route shown in FIG. 6, it can know only the number (in the case of FIG. 6, the number of the relay nodes is 15) of the relay nodes to the server device 3. Accordingly, the life setting section 14 may set the life that the repetition packet reaches the relay node just before the server device 3, that is, TTL=15. Alternatively, it may set the life that the repetition packet reaches the second reply node just before the server device or the third replay node just before the server device.

As described above, the information processing device 1 according to the first embodiment of the invention sets the life not reaching the server device 3 by the life setting section 12, when the life judging section 12 judges to "set the life not reaching the server device 3", and transmits the repetition packet having the life. Thereby, when the life judging section 12 judges to "set the life not reaching the server device 3", the repetition packet can be prevented from reaching the server device 3. As a result, the processing burden on the server device 3 can be reduced compared with the case where all the repetition packets have reached the server device 3. Meanwhile, even when the life judging section 12 judges to "set the life not reaching the server device 3", the life setting section 14 may set the life that exceeds the communication processing device 2 to the repetition packet so as to maintain the port in the communication processing device 2. Accordingly, it is possible to receive the packets, which are transmitted to the communication processing device 2 from the server device 3, in the information processing device 1.

In addition, the case where the life is set on the basis of the results counted by the relay node counting section 13 is described in the first embodiment of the invention. However, since the information processing device 1 sets, for example, the number of the relay nodes until the server device 3, the number of the relay nodes until the nearest relay node relaying the packets from the global address to the global address, or the number of stages of the communication processing device 2 having the NAT function, the life may be set by using the above setting. For example, as shown in FIG. 1, if the communication processing device 2 having the NAT function, which is connected to the information processing device 1, has one stage, when it is judged "to transmit the repetition packet not reaching the server device 3", the life setting section 14 may set the life of the repetition packet by setting "2" obtained by adding "1" to the number of the stages "1" of the communication processing device 2 as TTL.

Alternatively, in case of judging "to transmit the repetition packet not reaching the server device 3" and judging "to transmit the repetition packet reaching the server device 3", each value of the life that should be set may be set beforehand in the life setting section 14. For example, the value of TTL=2 may be set in the former case, and the value of TTL=255 may be set in the latter case.

In addition, the case which totally counts the number of the relay nodes until the node (for example, the server device 3) of a prescribed communication destination, by the trace route, in the count of the number of the relay nodes by the relay node counting section 13 was described. In this case, for example, when the life not reaching the server device 3 is set to the repetition packet, the life setting section 14 sets the life such that the repetition packet reaches the nearest relay node relaying the packets from the global address to the global address. In this case, the number of the relay nodes may be counted in the range to exceed the communication processing device having the NAT function. In addition, if the communication processing device is a multi-stage, the number of the relay nodes may be counted in the range to exceed all the communication processing device of the multi-stage.

For example, when the life setting section 14 sets the life such that the repetition packet reaches the nearest relay node relaying the packets from the global address to the global address, the count of the number of the relay nodes may be finished at the nearest relay node relaying the packets from the global address to the global address. More specifically, when TTL is set the packet of UDP while sequentially doing the increment to be transmitted, the count the number of the node relays may be finished at a point of time where IP address of the relay nodes returning the ICMP Time Exceeded has the global address. Moreover, the life setting section 14 may set the value of TTL that is set to the UDP packet at the point of time where the global address is returned as a life of the repetition packet.

Second Embodiment

An information processing system according to a second embodiment of the invention will be described with reference to the accompanying drawings. The information processing system according to the second embodiment of the invention may modify the life of the repetition packet in the communication processing device relaying the repetition packet.

Figure 7:
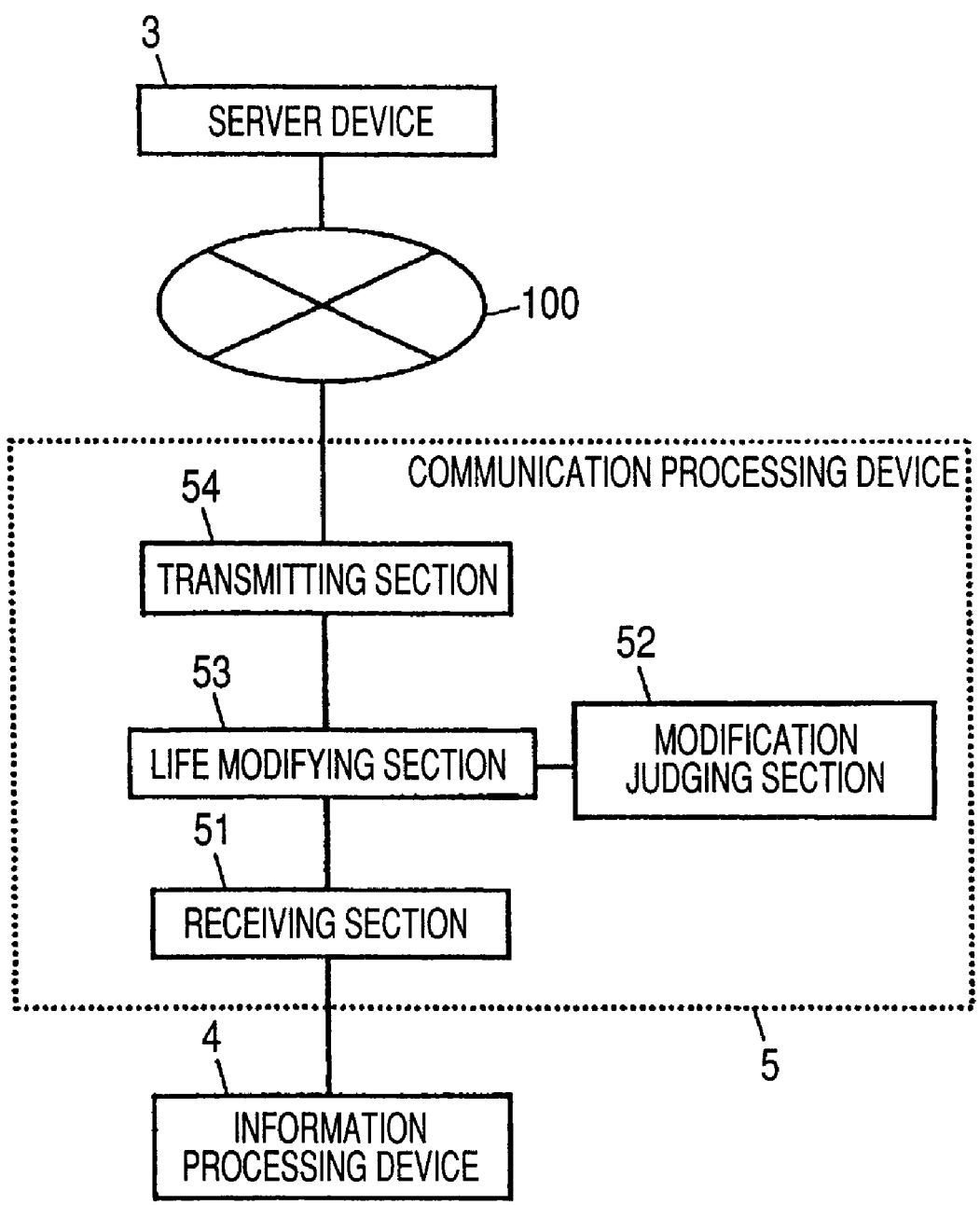
FIG. 7 is a block diagram showing a configuration of an information processing system according to a second embodiment of the invention.

FIG. 7 shows a configuration of the information processing system according to the second embodiment. In FIG. 7, the information processing system according to the second embodiment of the invention includes an information processing device 4, a communication processing device 5, and a server device 3. One information processing device 4 is connected to the communication processing device 5 in FIG. 7, but more than two information processing devices may be connected to the communication processing device 5. The information processing device 4 may be, for example, a personal computer, a microwave oven, a telephone, a printer, a facsimile machine, a refrigerator, a laundry machine, an air conditioner, a television, a video recorder, or a set top box, and repetitively transmits the repetition packet to the server device 3 as well as the information processing device 1 in the first embodiment of the invention. The communication processing device 5 is connected to the server device 3 through a communication line 100 of a cable or wireless. Furthermore, one communication processing device 5 is connected to the communication line 100 in FIG. 7, but more than two communication processing devices may be connected to the communication line 100. The term of, for example, the repetition packet or the life of the packet used in common with the first embodiment is equal to the first embodiment, and the description thereof will be omitted.

The information processing device 4 transmits the repetition packet that is a packet to be repetitively transmitted to the server device 3. The transmission of the repetition packet is equal to that of the first embodiment, and the description thereof will be omitted.

The communication processing device 5 relays the repetition packet that is a packet to be repetitively transmitted to the server device 3 from the information processing device 4. Furthermore, the communication processing device 5 includes a receiving section 51, a modification judging section 52, a life modifying section 53, and a transmitting section 54.

The receiving section 51 receives the repetition packet transmitted from the information processing device 4. In addition, the receiving section 51 may include a receiving device (for example, modem or network card) for performing the reception or may not. When the receiving section 51 includes the receiving device, the receiving device (not shown) is disposed between the receiving section 51 and the information processing device 4. Furthermore, the receiving section 51 may be realized by hardware, or may be realized by software such as a driver for driving the receiving device.

The modification judging section 52 judges whether to modify the life of the repetition received by the receiving section 51. For example, the modification judging section 52 may judge "to set the life of the repetition packet" with respect to a prescribed ratio of the repetition packets among the repetition packets received by the receiving section 51, or the modification judging section 52 may judge "to set the life of the repetition packet" with respect to the repetition packets satisfying a prescribed condition among the repetition packets received by the receiving section 51. In the second embodiment of the invention, the former will be described.

The life modifying section 53 modifies the life of the repetition packet received by the receiving section 51 to a life not reaching the server device 3, when the modification judging section 52 judges "to modify the life of the repetition packet". Meanwhile, the life modifying section 53 does not modify the life of the repetition packet received by the receiving section 51, when the modification judging section 52 does not judge "to modify the life of the repetition packet".

Here, for example, if the setting of the life is to show the period where the packet can exist in the communication line 100, the modification of the life means the modification of the period in which the packet can exist in the communication line 100. Meanwhile, if the setting of the life may be to show the number of the relay nodes in which the packet can pass through the communication line 100, the modification of the life means the modification of the number of the relay nodes. In the latter example, if the setting of the life is there the setting of TTL, the modification of the life is the modification of TTL with respect to the repetition packet. In addition, for example, since the communication processing device 5 is also one of the relay nodes, the communication processing device 5 also has a function for reducing the life (TTL) of the repetition packet by one. However, the modification of the life as one of the relay nodes is not included in the modification of the life by the life modifying section 53. That is, the modification of the life by the life modifying section 53 performs such that the repetition packet transmitted from the information processing device 4 is not reached to the server device 3. As described in the first embodiment of the invention, the relay node has a routing function for routing the packets and is called as a so-called "router".

The transmitting section 54 transmits the repetition packet. The repetition transmitted by the transmitting section 54 is a repetition packet having the life modified by the life modifying section 53 or a repetition packet having the life not modified by the life modifying section 53. In addition, the transmitting section 54 may include a transmission device (for example, modem or network card) for performing the transmission or may not. When the transmitting section 54 includes the transmission device, the transmission device (not shown) is disposed between the transmitting section 54 and the communication line 100. Furthermore, the transmitting section 54 may be realized by hardware, or may be realized by software such as a driver for driving the transmission device.

Furthermore, the communication processing device 5 has an NAT function and performs the address conversion of the packets transmitted from the information processing device 4 or the server device 3. Therefore, the communication processing device 5 has a mechanism performing the address conversion and a mechanism receiving the packets transmitted from the server device 3 to transmit to the information processing device 4. However, these mechanisms are not shown in FIG. 7. That is, FIG. 7 is a view showing only characteristic configuration of the communication processing device 5 according to the second embodiment of the invention.

The server device 3 is equal to that of the first embodiment of the invention. Accordingly, the description thereof will be omitted.

Next, the operation of the communication processing device 5 according to the second embodiment of the invention will be described with reference to a flowchart of FIG. 8.

(Step S201) The receiving section 51 judges whether or not the packets are received. When the packets are received and TTL is set to the packets, the process goes to step S202 by reducing the TTL to be set by one, and if not, the process of step S201 is repeated until the packets are received.

(Step S202) The receiving section 51 judges whether or not the received packets is the repetition packet. If the received packets are the repetition packet, the process goes to step S203. If the received packets are not the repetition packet, the packets are delivered to the transmitting section 54 through the life modifying section 53 to go to step S205.

(Step S203) The modification judging section 52 judges whether to modify the life of the received repetition packet. In addition, when the life is modified, the process notifies the gist to the life modifying section 53 and goes to step S204. Meanwhile, when the life is not modified, the process notifies the gist to the life modifying section 53 and goes to step S205.

(Step S204) The life modifying section 53 modifies the repetition packet received by the receiving section 51. The modification of the life, as described above, is performed such that the repetition packet is not reached to the server device 3. In addition, the repetition packet having the modified life is delivered to the transmitting section 54.

(Step S205) The transmitting section 54 transmits the received packets to the server device 3. In this case, since the communication processing device 5 has the NAT function, the IP address and the port of the transmission source of the packets to be transmitted are converted into the IP address and the port at the side of WAN of the communication processing device 5. The TTL is set as a packet in which the transmitting section 54 tries to transmit. If the TTL is "0", the transmitting section 54 does not transmit the packets and may allow the packets to return to the information processing device 4 through the path not shown due to the ICMP Time Exceeded.

Figures 8, 9A, 9B:
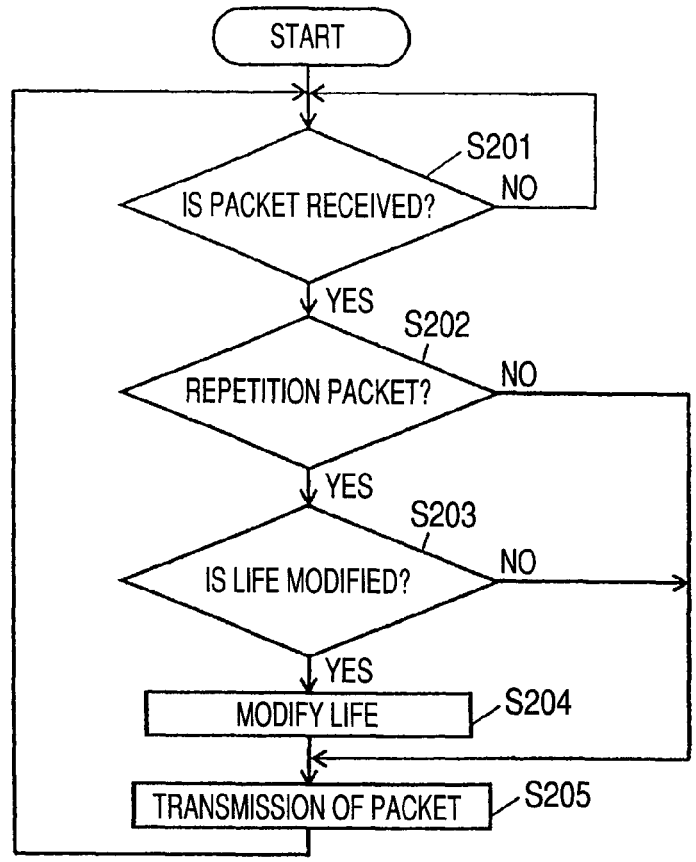
FIG. 8 is a flow chart showing an operation of a communication processing device according to a second embodiment of the invention.
FIG. 9A is a view showing an example of a repetition packet table according to a second of the invention.
FIG. 9B is a view showing another example of a repetition packet table according to a second of the invention.

Furthermore, in the flowchart of FIG. 8, the process is accomplished by a power-off or an interruption of a processing end.

Next, the operation of the information processing system according to the second embodiment of the invention will be described by using an illustrative example. As an illustrative example, the information processing device 4 transmits the repetition packet at a period shorter than the port maintaining time. In addition, the modification judging section 52 sets the life by modifying the TTL of the repetition packet. Furthermore, the modification judging section 52 modifies the life such that one repetition packet out of ten repetition packets reaches the server device 3. In addition, the IP address of the information processing device 4, the communication processing device 5, and the server device 3 is equal to that of the first embodiment of the invention except the information processing device 1 and the communication processing device 2 are the information processing device 4 and the communication processing device 5, respectively. Therefore, the IP address at the side of WAN of the communication processing device 2 is a global address. The header of the packet includes a flag showing whether or not it is the repetition packet. When it is the repetition packet, "1" is substituted into the flag. Moreover, when it is not the repetition packet, "0" is substituted into the flag. The receiving section 51 can judge whether or not the received packets are the repetition packet by reference the value to be substituted into the flag.

First, it is assumed that a first repetition packet from the information processing device 4 is transmitted to the server device 3. Then, this repetition packet is received by the receiving section 51 (step S201). Since "1" is substituted into the flag included in the header of this repetition packet, the receiving section 51 judges the received packets as a repetition packet (step S202). In addition, TTL=255 that is set to the repetition packet is reduced by one to TTL=254. The repetition packet is delivered to the life modifying section 53.

IP address "192. 168. 111" of the transmission source (information processing device 4) and IP address "155. 32. 10. 10" of the transmission destination (server device 3) are included in the header of the repetition packet. The modification judging section 52 judges whether or not the repetition packet is transmitted in past times from the transmission source to the transmission destination with reference to the IP address of the transmission source and the transmission destination. In this case, since it is the first repetition packet, the transmission was performed in the past times. Therefore, it is judged to perform the modification of the life in this case (step S203). As a result, the repetition packet is transmitted from the transmitting section 54 (step S205) and is received in the server device 3.

Furthermore, the modification judging section 52 registers information relative to this repetition packet in a repetition packet table, when the first repetition packet is received. FIGS. 9A and 9B are views showing an example of the repetition packet table. As shown in FIGS. 9A and 9B, the IP address of the transmission source of the repetition packet, the IP address of the transmission destination of the repetition packet, and field of a counter relative to the repetition packet are recorded in the repetition packet table. Here, the counter is the value indicating only a first-order digit of the value that shows the number of the repetition packets transmitted to the transmission destination address. That is, the following value of the value "9" of the counter becomes "0". A first record of FIG. 9A is about the first repetition packet transmitted from the information processing device 4.

Next, if a second repetition packet is transmitted to the server device 3 from the information processing device 4, this repetition packet is also received in the receiving section 51 (step S201). Moreover, it is judged as a repetition packet (step S202) to judge whether or not the modification of the life is required. The modification judging section 52 judges whether or not the record corresponding to the address of the received repetition packet is registered in the repetition packet table. In this case, a first record of FIG. 9A is corresponded. Accordingly, since the value of the counter corresponding to the received repetition packet is "1", the modification judging section 52 judges to modify the life (step S203), and the life modifying section 53 modifies the TTL set to the repetition packet to "1" (step S204). Consequently, the repetition in which the TTL is modified to "1" is transmitted from the transmitting section 54 (step S205). The repetition packet in which the TTL is modified becomes TTL=0 in the following relay node of the communication processing device 5 and will be transmitted no further. In addition, the value of the counter in the first record of FIG. 9A is increased into "2" by the modification judging section 52. As a same manner, even when the value of the counter corresponding to the repetition packet is 2 to 9, the life of the repetition packet transmitted to the server device 3 from the information processing device 4 is modified. Therefore, the repetition packet does not reach the server device 3.

Meanwhile, it is assumed that the value of the counter becomes "0" by the increase thereof, as shown in the first record of FIG. 9b. Then, if the communication processing device 5 receives the repetition packet transmitted to the server device 3 from the information processing device 4 (step S201, S202), since the value of the counter is "0", it is judged that "the life is not modified" (step S203). Therefore, the repetition packet of TTL=254 is transmitted to the server device 3 from the transmitting section 54, and this repetition packet is received in the server device.

In addition, when the packet which is not the repetition packet is transmitted from the information processing device 4, it is judged that the packet is not the repetition packet in the receiving section 54. Accordingly, the TTL is reduced by one, and this packet is transmitted to the transmission destination of this packet from the transmitting section 54.

As described above, in the information processing device 5 according to the second embodiment of the invention, when the modification judging section 52 judges to "set the life not reaching the server device 3", the life of the repetition packet is modified to the life not reaching the server device 3 by the life modifying section 53, and the repetition packet having the modified life is transmitted. By transmitting the repetition packet having the modified life, when the modification judging section 52 judges to "set the life not reaching the server device 3", the repetition packet can be prevented from reaching the server device 3. As a result, the processing burden on the server device 3 can be reduced compared with the case where all the repetition packets have reached the server device 3. Meanwhile, even when the modification judging section 12 judges to "set the life not reaching the server device 3", the port is maintained in the communication processing device, and the packets transmitted to the communication processing device 5 from the server device 3 are transmitted to the information processing device 4 through the port to be maintained (this path is not shown).

In addition, according to the second embodiment of the invention, since the IP address at the side of WAN of the communication processing device 5 is the global address, if it is judged that that the life of the repetition packet is maintained, the case where the life modifying section 53 modifies the life (TTL) of the repetition packet into "1" is generated. The above case was described in the second embodiment of the invention. Meanwhile, when NAT of a multi-stage is configured, if it is judged "to modify the life of the repetition packet", the life modifying section 53 may modify the life of the repetition packet into the life capable of exceeding all the NAT of the multi-stage. Here, the case where the NAT of the multi-stage is configured means the case where the IP address at the side of the communication processing device 5 is the private address and the communication processing device 5 is located at the LAN side of the communication processing device having different NAT function.

That is, the life modifying section 53 may set the life such that the repetition packet is reached to the relay node relaying the packets from the global address to the global address, when the modification judging section 52 judges "to modify the life of the repetition packet". In this case, as in the first embodiment of the invention, the communication processing device 5 has the relay node counting section, the number of the relay nodes from the communication processing device 5 is counted, and the life of the repetition packet is set as follows. That is, the life modifying section 53 may, for example, (1) set the life so that the repetition packets reach the relay node one or more just before the server device 3, (2) set the life so that the repetition packets reach the relay node relaying the packets from the global address to the global address, and set the life by a combination of (1) and (2). Alternatively, in the communication processing device, for example, since the number of the relay nodes until the server device 3, the number of the relay nodes until the nearest relay node relaying the packets from the global address to the global address, and the number of the stages of the communication processing device having the NAT function are set, it may set the life by using the setting.

Figure 10:
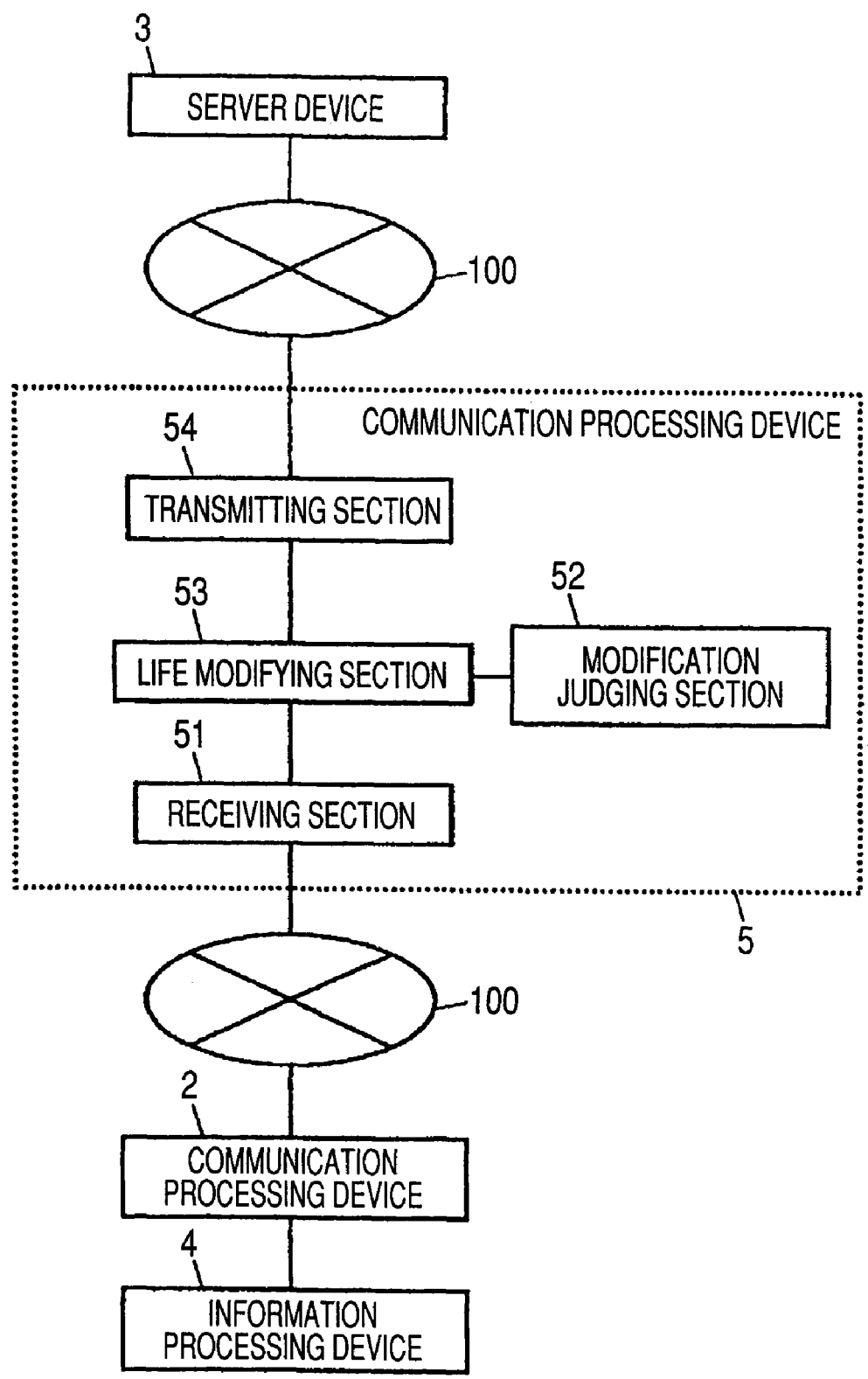
FIG. 10 is a block diagram showing another configuration of an information processing system according to a second embodiment of the invention.

In addition, although it is described in the second embodiment that the life of the repetition packet is modified in the communication processing device relaying packets between the private address and the global address, the life modification of the repetition packet, as shown in FIG. 10, may be performed in the communication processing device 5 as a relay node relaying packets from the global address to the global address. In this case, the same processes as those in the second embodiment are performed except that the address is converted in the communication processing device 5. When the life of the repetition packet is modified in the communication processing device 5 as the relay node relaying packets from the global address to the global address, the port is maintained in the communication processing device having NAT function because the repetition packet is already passing through the communication processing device (the communication processing device 2 in FIG. 10) having the NAT function. Therefore, in the communication processing device 5 as the relay node relaying packets from the global address to the global address, a predetermined life may be set by the life modifying section 53 when the modification judging section 52 has judged to modify the life of the repetition packet. The predetermined life is, for example, a life that comes to an end right after the modification of life. Specifically, it may be included that the TTL is modified to 0 or 1 when the life is set through setting the TTL with respect to the packet. When the TTL is modified to 0, the repetition packet is not transmitted from the transmitting section 54 and becomes extinct in the communication processing device 5 because the life comes to an end in the communication processing device 5. In addition, in this case, the packets of the ICMP Time Exceeded may be returned to the information processing device 4 of transmission source. As described above, the relay node relaying packets from the global address to the global address at the side of WAN may be also included in the communication processing device 5.

In addition, in each embodiment, it is mainly described that the life of the repetition packet is set through setting the TTL that the repetition packet has. However, as described above, the life of the repetition packet may be, for example, set through setting a limit of period during which the repetition packet can be present in the communication line 100. In this case, for example, the time at which the repetition packet is transmitted from the information processing device and the period that represents the life may be set. As for the relay node, when it is judged that the period representing the life elapsed from the time at which the repetition packet was transmitted, the repetition packet is abandoned. In this case, like the setting of the TTL, packets similar to the ICMP Time Exceeded may be returned to the information processing device of transmission source of the repetition packet.

In addition, in each embodiment, it is mainly described that the life judging section 12 and the modification judging section 52 have judged to set the life for the repetition packet not to reach the server device 3 with respect to a predetermined ratio of the repetition packets. However, as described above, the life judging section 12, etc. may judge to set the life for the repetition packet not to reach the server device 3 with respect to repetition packets satisfying a predetermined condition. For example, when the repetition packet is a TCP packet, TCP sequence number is included in the header of the packet. Referring to the TCP sequence number included in the repetition packet, the life judging section 12, etc. may judge to set the life for the repetition packet not to reach the server device 3 when the TCP sequence number satisfies the predetermined condition (for example, when the sequence number is represented as a decimal number, a value in the first-digit of the decimal number is not 0).

In addition, for example, in the second embodiment, the count value representing the frequency of transmission of the repetition packet is included in the repetition packet transmitted from the information processing device 4. Then, for example, according to whether the count value satisfies the predetermined condition (for example, whether a value in the first place of the count value is not 0), it may be judged whether the life of the repetition packet is modified or not. Alternatively, information representing whether the packet needs to reach the server device 3 may be included in the repetition packet transmitted from the information processing device 4. Then, according to the information, it may be judged whether the life of the repetition packet is modified or not.

In addition, for example, in the second embodiment, when the repetition packet transmitted from the information processing device 4 satisfies the condition that "TTL is equal to 1", in other words, when the repetition packet satisfies the condition that the TTL reduces and becomes 0 in the receiving section 51, the communication processing device 5 may modify the TTL of the repetition packet to "1" in the life modifying section 53 and may transmit the repetition packet where the TTL is equal to 1 to the server device 3. Originally, when the TTL of the repetition packet transmitted from the information processing device 4 is equal to 1, the TTL becomes 0 in the communication processing device 5 and the packets of the ICMP Time Exceeded are returned to the information processing device 4. However, since the communication processing device has the above described function, the repetition packet where the life of packet is set not to reach the server device 3 and where the TTL is equal to 1 is transmitted from the information processing device 4 and is sequentially transmitted in the communication processing device having NAT function when the communication processing device (having NAT function) is configured to have a multi-stage like in the first embodiment. In addition, the packet sequentially transmitted in the communication processing device may reach the relay node (not having the above described function) relaying packets from the global address to the global address and the port may be maintained with respect to the whole of NAT that is a multi-stage on the side of WAN of the information processing device 4.

In addition, "to judge to set the life for the repetition packet not to reach the server device 3 with respect to packets satisfying a predetermined condition" may be "to judge to set the life not reaching the server device 3" with respect to the repetition packets satisfying a predetermined condition A, or "to judge to set the life reaching the server device 3" with respect to the repetition packet not satisfying the condition A. Also, both of judgments may be performed.

In addition, in each embodiment, although it is described that the repetition packets are packets of UDP and TCP, other repetition packets beside them may be allowed so long as the packets are repeatedly transmitted.

In addition, in each embodiment, although it is described that transmitting timing of the repetition packets is calculated using a timer, a clock or a clock signal, etc. instead of the timer may be used irrespective of calculating means.

In addition, in each embodiment, although it is described that the information processing device is connected to the communication line 100 via only one communication processing device, the information processing device may be connected to the communication line 100 via a plurality of communication processing devices (in other words, communication processing devices having multiple connection may be configured).

In addition, according to each embodiment of the invention, the communication processing device 2 and 5 has the NAT function, but the communication processing device 2 and 5 may have a Firewall function of a packet filtering instead of the NAT function or together with the NAT function. Here, the packet filtering is to select the received packets on the basis of, for example, the above-mentioned receive filter rule. When the communication processing device 2 has the firewall function based on such receive filter rule, a transmission history is left in the communication processing device 2 or the like by the transmission of the repetition packet from the side of LAN (the side of the information processing device 1) to the side of WAN (the side of the communication line 100). Therefore, it is possible to accept the packets transmitted to the communication processing device 2 or the like from the server device 3.

Furthermore, according to each embodiment of the invention, the server device is specified by the IP address, but the server device may be specified depending on a domain name (for example, server. pana. net). In this case, since the domain name is converted into the IP address by using DNS server, the server device may be specified.

In addition, a communication protocol according to each embodiment of the invention may be, for example, IPv4 (Internet Protocol version 4), or may be IPv6 (Internet Protocol version 6).

Furthermore, according to each embodiment of the invention, each process (each function) may be realized by an integrated process due to a single device (system), or may be realized by a dispersed process due to plural devices.

In addition, according to each embodiment of the invention, each component may be configured by own hardware, or components capable of realizing by software may be realized by executing a program. For example, software program recorded on the recording medium such as a hard disk or semiconductor memory is read by a program executing unit such as CPU to be executed, thereby each component may be realized.

Furthermore, the software realizing the information processing device in the first embodiment of the invention is a following program. That is, a program to be executed by a computer carries out a processing that transmits a packet to a server device through one or more communication processing device, the program causing a computer to execute a processing including a transmission judging step of judging whether to transmit a repetition packet that is the packet to be repetitively transmitted; a life judging step of judging whether to set a life not reaching the server device to the repetition packet; a life setting step of setting the life of the repetition packet to the life not reaching the server device in case of judging to set the life not reaching the server device in the life judging step, and setting the life of the repetition packet to the life reaching the server device in case of judging to set the life reaching the server device in the life judging step; and a transmission step of transmitting a repetition packet having the life set in the life setting step, in case of judging to transmit the repetition packet in the transmission judging step.

In addition, the program may further execute, in the computer, a relay node counting step of counting the number of relay nodes. In this case, the life of the repetition packet may be set in the life setting step on the basis of the number of the relay node counted in the relay node counting step.

Furthermore, the software realizing the information processing device in the second embodiment of the invention is a following program. That is, a program to be executed by a computer carries out a processing that relays a repetition packet, which is a packet to be repetitively transmitted, to a server device from an information processing device, the program causing a computer to execute a processing including a receiving step of receiving the repetition packet; a modification judging step of judging whether to modify a life of the repetition packet received in the receiving step; a life modifying step of modifying the life of the repetition packet received in the receiving step to a life not reaching the server device in case of judging to modify the life of the repetition packet in the modification judging step; and a transmitting step of transmitting the repetition packet.

In addition, in the program, the transmission step for transmitting information or the receiving step for receiving information does not a process that performs by the hardware, for example, a process (a process that performs by only the hardware) that performs by a modem or interface card in the transmission step.

Furthermore, this program may be executed by being downloaded from the server or the like, or may be executed by reading the program recorded on a prescribed recording medium (for example, a optical disc such as CD-ROM, a magnetic disc, a semiconductor memory).

In addition, the computer for executing this program may be a singular or plural. That is, the integrated process may be performed, or the dispersed process may be performed.

It will be understood by those of ordinary skill in the art that various changes may be made therein without being limited in the above-described embodiments and the changes are included in the scope of the invention.

INDUSTRIAL APPLICABILITY

As described above, an information processing device and the like according to the present invention allows some repetition packets among the repetition packets for transmitting from the information processing device not to reach a server device. Therefore, it is useful as the information processing device and the like that can reduce a processing burden on the server device.

The invention claimed is:

1. An information processing device for transmitting a packet into a server device through one or more communication processing devices, comprising:

a relay node counting section for determining a number of relay nodes through which the packet is to be transmitted after being transmitted from the information processing device to reach the server device;

a life judging section for judging whether to set a life not reaching the server device to a repetition packet, the life not reaching the server device being a number of relay nodes from the information processing device that the repetition packet is to be transmitted without reaching the server device;

a transmission judging section for judging to repetitively transmit the repetition packet after determining the number of relay nodes between the information processing device and the server device by the life judging section, wherein the transmission judging section judges to transmit the repetition packet at a suitable frequency to transmit at least one repetition packet during a port maintenance period of the one or more communication processing devices to maintain continued accessibility of a port of the communication processing device over a wide area network by the server device beyond the port maintenance period;

a life setting section for setting the life of the repetition packet to the life not reaching the server device when the life judging section judges to set the life not reaching the server device, and setting the life of the repetition packet to the life reaching the server device when the life judging section judges to set the life reaching the server device; and a transmitting section for transmitting the packet to be received by the server device and the repetition packet to be transmitted over a local network and received by the one or more communication processing devices to be transmitted with the life set by the life setting section over the wide area network, but without reaching the server, when the transmission judging section judges to transmit the repetition packet.

2. The information processing device according to claim 1, wherein the life setting section sets the life of the repetition packet to a life that reaches one or more relay node just before the server device, when the life judging section judges to set the life not reaching the server device.

3. The information processing device according to claim 1, wherein the life setting section sets the life such that the repetition packet can reach a relay node for relaying the repetition packet from a global address to a global address, when the life judging section judges to set the life not reaching the server device.

4. The information processing device according to claim 1, wherein the setting of the life is a setting of TTL that is included in the repetition packet.

5. The information processing device according to claim 1, wherein the life setting section sets the life of the repetition packet on the basis of the number of the relay node counted by the relay node counting section.

6. The information processing device according to claim 5, wherein the relay node counting section counts the number of the relay nodes by a trace route.

7. The information processing device according to claim 1, wherein the life judging section judges to set the life of a prescribed ratio of the repetition packets among the repetition packets to be transmitted, to a life not reaching the server device.

8. The information processing device according to claim 1, wherein the life judging section judges to set the life of the repetition packets satisfying a prescribed condition among the repetition packets to be transmitted, to a life note reaching the server device.

9. An information processing system comprising the information processing device according to claim 1, the one or more communication processing devices, and the server device.

10. A communication processing device for relaying a repetition packet that is a packet to be repetitively transmitted to a server device from an information processing device, comprising:

a receiving section for receiving, over a local network from the information processing device included in the local network, the repetition packet having a first life to cause transmission of the repetition packet to a first destination over a wide area network;

a modification judging section for judging to modify the first life of the repetition packet received in the receiving section during a port maintenance period to maintain access to the port beyond the port maintenance period;

a life modifying section for modifying the first life of the repetition packet received in the receiving section to provide the repetition packet with a modified life that is shorter than the first life to cause the repetition packet to be transmitted over the wide area network in a direction toward the server device to a second destination other than an originator of the repetition packet that is short of the first destination in response to the judging by the modification judging section to modify the first life of the repetition packet; and a transmitting section operatively connected to transmit the repetition packet over the wide area network for transmitting the repetition packet with the modified life in the direction of the server device.

11. The communication processing device according to claim 10, wherein the modification of the first life is a modification of TTL relative to the repetition packet.

12. The communication processing device according to claim 10, wherein the modification judging section judges to modify the first life of a prescribed ratio of the repetition packet among the repetition packets received in the receiving section.

13. The communication processing device according to claim 10, wherein the modification judging section judges to modify the first life of the repetition packet satisfying a prescribed condition among the repetition packets received in the receiving section.

14. The communication processing device according to claim 10, wherein the communication processing device has an NAT function.

15. The communication processing device according to claim 14, wherein the life modifying section sets the modified life such that the repetition packet can reach a relay node for relaying the repetition packet from a global address to a global address, when the modification judging section judges to modify the first life of the repetition packet.

16. The communication processing device according to claim 10, wherein the communication processing device is a router for relaying the repetition packet from a global address to a global address.

17. The communication processing device according to claim 16, wherein the life modifying section sets a predetermined modified life, when the modification judging section judges to modify the first life of the repetition packet.

18. An information processing system comprising the communication processing device according to claim 10, the information processing device for transmitting the repetition packet, and the server device.

19. An information processing method for transmitting a packet to a server device from an information processing device through one or more communication processing devices comprising:
- determining a number of relay nodes from the information processing device from which the packet originated to the server device through which the packet is to be transmitted after being transmitted from the information processing device and before reaching the server device;
- judging to set a life not reaching the server device to a repetition packet, the life not reaching the server device being a number of relay nodes from the information processing device to which the repetition packet is to be transmitted without reaching the server device;
- subsequent to said determining, judging to repetitively transmit the repetition packet at a suitable frequency to transmit at least one repetition packet during a port maintenance period of the one or more communication processing devices to maintain continued accessibility of a port of the communication processing device over a wide area network beyond the port maintenance period, the port being operable to receive content transmitted by the server device over the wide area network and to transmit the repetition packet in an outbound direction over the wide area network;
- a life setting step of setting the life of the repetition packet to the life not reaching the server device in case of judging to set the life not reaching the server device in the life judging step and setting the life of the repetition packet to the life reaching the server device in case of judging to set the life reaching the server device in the life judging step in the information processing device;
- a transmission judging step of judging to transmit the repetition packet within a the port maintenance period to maintain accessibility of the port of the communication processing device over the wide area network beyond the port maintenance period; and
- a transmission step of transmitting the repetition packet from the one or more communication processing devices over the wide area network, the repetition packet having the life not reaching the server device set in the life setting step, in case of judging to transmit the repetition packet in the transmission judging step in the information processing device.

20. The information processing method according to claim 19, wherein the life of the repetition packet is set in the life setting step on the basis of the number of the relay node counted in the relay node counting step.

21. A communication processing method of relaying a repetition packet in a communication device, which is a packet to be repetitively transmitted, to a server device from an information processing device comprising:
- a receiving step of receiving, over a local network, the repetition packet output from the information processing device included in the local network in the communication device, the repetition packet to be transmitted from the communication device over a wide area network and having a first life to cause transmission of the repetition packet to a first destination when received by the communication device;
- a modification judging step of judging in the communication device to modify the first life of the repetition packet received in the receiving step to be transmitted during a port maintenance period to extend access to a port provided to the communication device beyond the port maintenance period;
- a life modifying step of modifying the first life of the repetition packet received in the receiving step to provide the repetition packet with a modified life that is shorter than the first life to cause the repetition packet to be transmitted over the wide area network in an outbound direction from the information processing device toward the server device to a second destination that is short of the first destination in response to the judging to modify the first life of the repetition packet in the modification judging step; and
- a transmitting step of transmitting the repetition packet over the wide area network in the outbound direction toward the server device from the communication processing device with the modified life.

22. A non-transitory computer-readable medium storing computer-executable logic to be executed by a computer connected to a server device over a wide area communication network for carrying out a processing that transmits a packet to the server device through one or more communication processing devices included in a local network of the computer, the computer-executable logic, when executed, causing the computer to execute a method comprising:
- determining a number of relay nodes from an information processing device to the server device through which the packet is to be transmitted after being transmitted from the information processing device over the wide area communication network before reaching the server device;
- subsequent to said determining, judging to repetitively transmit the repetition packet at a suitable frequency to transmit at least one repetition packet during a port maintenance period of the one or more communication processing devices to maintain continued accessibility of a port of the communication processing device over the wide area communication network beyond the port maintenance period, the port being operable to receive content transmitted by the server device over the wide area network and to transmit the repetition packet outward over the wide area network;
- a life judging step of judging whether to set a life not reaching the server device to the repetition packet, the life not reaching the server device being a number of relay nodes counted from the information processing device and progressing away from the information processing device to which the repetition packet is to be transmitted without reaching the server device;
- a life setting step of setting the life of the repetition packet to the life not reaching the server device in case of judging to set the life not reaching the server device in the life judging step, and setting the life of the repetition packet to the life reaching the server device in case of judging to set the life reaching the server device in the life judging step; and
- a transmission step of transmitting the repetition packet having the life set in the life setting step over the local network to be received by the one or more communication processing devices to be transmitted over the wide area communications network toward the server device, in case of judging to transmit the repetition packet in the transmission judging step.

23. The logic to be executed by a computer according to claim 22, wherein the processing further comprises a relay node counting step of counting the number of relay nodes, and the life of the repetition packet is set in the life setting step on the basis of the number of the relay node counted in the relay node counting step.

24. A non-transitory computer-readable medium storing computer-executable logic to be executed by a computer connected to a server device over a wide area communication network for carrying out a processing that relays a repetition packet, which is a packet to be repetitively transmitted, to the server device from an information processing device, the logic causing the computer to execute a method comprising:

a receiving step of receiving, over a local network, the repetition packet having a first life transmitted by the information processing device to cause transmission of the repetition packet to a first destination;

a modification judging step of judging to modify the first life of the repetition packet received in the receiving step;

a life modifying step of modifying the first life of the repetition packet received in the receiving step to provide the repetition packet with a modified life that is shorter than the first life to cause the repetition packet to be transmitted during a port maintenance period to a second destination other than an originator of the repetition packet and toward the server device relative to the information processing device that is short of the first destination in response to the judging to modify the life of the repetition packet in the modification judging step; and a transmitting step of transmitting the repetition packet with the modified life from the computer over the wide area communications network toward the server device but not reaching the server during the port maintenance period to maintain access to a port over the wide area communication network beyond the port maintenance period.

* * * * *